(12) United States Patent
Youngwerth et al.

(10) Patent No.: US 11,644,069 B2
(45) Date of Patent: May 9, 2023

(54) INTERNAL ADJUSTER FOR CLUTCH CONTAINING AN EXPANDING FRICTION DISK

(71) Applicant: REKLUSE RACING, LLC, Mentor, OH (US)

(72) Inventors: Albert J. Youngwerth, Boise, ID (US); Sean G. Brown, Boise, ID (US); Karl E. Jensen, Boise, ID (US); Logan P. Krueger, Boise, ID (US); Gabe Sutherland, Boise, ID (US); Sarah Haight, Boise, ID (US); Dayne Konrad, Boise, ID (US); Calvin Brown, Boise, ID (US)

(73) Assignee: Rekluse Racing, LLC, Boise, ID (US)

( * ) Notice: Subject to any disclaimer, the term of this patent is extended or adjusted under 35 U.S.C. 154(b) by 0 days.

(21) Appl. No.: 15/992,023

(22) Filed: May 29, 2018

(65) Prior Publication Data

US 2019/0003533 A1    Jan. 3, 2019

Related U.S. Application Data

(60) Provisional application No. 62/511,813, filed on May 26, 2017.

(51) Int. Cl.
*F16D 43/12* (2006.01)
*F16D 43/18* (2006.01)

(52) U.S. Cl.
CPC ........... *F16D 43/12* (2013.01); *F16D 43/18* (2013.01)

(58) Field of Classification Search
CPC ........ F16D 13/75; F16D 13/757; F16D 43/18; F16D 43/12
See application file for complete search history.

(56) References Cited

U.S. PATENT DOCUMENTS

| | | | | |
|---|---|---|---|---|
| 7,810,624 | B1 * | 10/2010 | Overton | F16D 43/10 192/103 A |
| 8,459,430 | B2 * | 6/2013 | Youngwerth, Jr | F16D 43/18 192/105 B |
| 9,822,828 | B2 * | 11/2017 | Youngwerth | F16D 13/648 |
| 2009/0242351 | A1 * | 10/2009 | Youngwerth, Jr | F16D 43/12 192/103 A |
| 2016/0208868 | A1 * | 7/2016 | Austin | F16D 43/10 |

* cited by examiner

*Primary Examiner* — David R Morris
(74) *Attorney, Agent, or Firm* — Shaver & Swanson; Scott D. Swanson

(57) ABSTRACT

An improved adjuster for a clutch having an expanding friction disk. The improved adjuster allows desirable characteristics of a clutch pressure plate to be maintained while allowing an operator to bias the pressure plate into proper position to accommodate the function of the expanding friction disk.

19 Claims, 16 Drawing Sheets

INTERNAL ADJUSTER FOR CLUTCH CONTAINING AN EXPANDING FRICTION DISK

PRIORITY/CROSS-REFERENCE TO RELATED APPLICATIONS

This application claims the benefit of U.S. Provisional Application No. 62/511,813 filed May 26, 2017, the disclosure of which is incorporated by reference.

TECHNICAL FIELD

The presently disclosed technology relates to vehicle clutches, and more particularly to clutches with expanding friction disks.

BACKGROUND

This invention relates to a clutch system of the friction type placed in a power transmission system. Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism.

Typically, such clutch systems include a clutch disengagement system utilizing a clutch lever mechanically coupled to the pressure plate such that when the clutch lever is actuated, the pressure plate's compressive force on the clutch pack is removed, disconnecting the rotational coupling between the clutch input and clutch output. Clutch disengagement systems typically couple the clutch lever to the pressure plate mechanically through a hydraulic actuation system or a cable actuation system. The clutch system incorporated in a 2011 Honda CRF-450R represents a typical prior art clutch system.

Most motorcycles incorporate a manual transmission coupled to the engine via a multi-plate clutch assembly. Typically, the multi-plate clutch is engaged/disengaged by the driver via a clutch lever mounted on the handlebar. Although the clutch lever operated clutch allows the driver to control the clutch engagement/disengagement, often times motorcycle drivers find the clutch lever difficult to operate smoothly. New riders have difficulty adjusting to smoothly engaging the clutch while operating the throttle to move the vehicle from a standing start. Experienced riders may need to partially disengage the clutch when traveling slowly to allow the engine to continue running without stalling. Motorcycle racers often have a difficult time controlling the engagement of the clutch and the application of the throttle to maximize acceleration. Off-road motorcycle racers often need to stop the rear wheel suddenly with the rear brake, causing the engine to stall if the clutch is not first disengaged. An automatic clutch can help overcome many of the problems associated with a manual clutch.

U.S. Pat. No. 8,459,430 discloses an automatic clutch system incorporating an expanding friction disk and is incorporated herein by reference.

The prior art shows expanding friction disk designs comprised of centrifugal weights housed between a first plate and a second plate where the first plate and second plate are compressed together with biasing springs wherein the centrifugal weights, first plate and second plate contain features which provide a sliding contact interface between them with at least one side of the interface being a ramp mechanism. The ramp mechanism provides the relative lift to create expansion when the centrifugal weights move outwardly and overcome the biasing springs due to centrifugal force. In some designs the centrifugal weights are ball bearings which slide in grooves formed into either the first plate or second plate.

Additionally, the prior art shows an adjustable pressure plate assembly not of typical construction for standard clutches. This adjustable pressure plate assembly utilizes a pressure plate adjuster with a preferred embodiment being a threaded pressure plate adjuster. The threaded pressure plate adjuster biases the pressure plate to a set position as required to allow for proper operation of a clutch outfitted with an expanding friction disk. This threaded pressure plate adjuster attaches directly to a pressure plate that is non-standard to facilitate the attachment of the adjuster. To hold the threaded pressure plate adjuster in place once set to the desired position, tapered set screws are used creating a wedge to lock the rotational position of the threaded adjuster to the pressure plate.

Some versions of the Core EXP product by Rekluse Motor Sports incorporate an adjustable pressure plate assembly. Specifically, product number RMS-7714 revision D manufactured by Rekluse Motor Sports utilizes an adjustable pressure plate assembly. The RMS-7714 revision D product was designed for the 2011 Honda CRF450R motorcycle.

The adjustable pressure plate assembly contained in products like the RMS-7714 revision D product has been well received. One of the reasons for this is the adjustable pressure plate assembly allows for a fully functional clutch lever providing the user the ability to have full use of the clutch lever to override the clutch for disengagement and engagement similar to how the clutch lever performs with a standard clutch not containing and expanding friction disk.

There exist some drawbacks with adjustable pressure plate assemblies as typified by the prior art of reference. One such drawback is the constraint the construction of adjustable pressure plate assembly's place on matching the flexing characteristics of a standard pressure plate. Another drawback is the difficulty required in locking the threaded adjuster in place specifically, if the installer forgets to tighten the tapered locking set screws the set screws can loosen to the point of falling out which can result in clutch and/or engine damage. Additionally the adjustable pressure plate assembly is designed to optimize clutch lever positioning when in use and does not allow the user to alternately adjust the position of the pressure plate externally through the cable while maintaining similar rotational position of the clutch actuator arm.

Matching the flexing characteristics of the standard pressure plate is important in that standard pressure plates are what customers are used to. When pressure plate flex and rate of flex changes in association with a non-standard pressure plate and associated adjuster it provides a noticeable difference in how the clutch lever feels along with changing the distance the clutch lever has to be pulled in order to provide the desired amount of clutch engagement or disengagement. Further minimizing the risk of the locking mechanism loosening or dislodging is desirable and providing the option to deactivate the adjuster and utilize the existing cable system to bias the pressure the plate without sub-optimizing the function and feel of the clutch lever is desirable.

Therefore a need exists for an improved adjuster mechanism for biasing the pressure plate into the position needed to ensure proper function of the expanding friction disk while allowing for more freedom to design the pressure plate to better optimize clutch lever feel; and to reduce the risk of the locking mechanism from becoming deactivated and potentially dis-lodged; and to accommodate the pressure plate being lifted externally through the available clutch-cable system without negatively affecting clutch lever feel and performance for the operator.

It is therefore an object of the present invention to provide an improved adjuster mechanism for internally setting the position of the pressure plate to a position which optimizes performance of a clutch equipped with an expanding friction disk while improving the clutch lever feel and/or modulation the rider experiences when using the clutch lever to manually engage and disengage the clutch.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

The disclosed technology is an adjuster for positioning a clutch pressure plate into a set desired position. This adjuster is designed to work in a clutch, such as those that are used in motorcycles. This type of clutch has a clutch basket with fingers and slots between the fingers, with the clutch basket typically made of aluminum in order to reduce weight. The clutch basket is loaded with friction disks that are either operatively attached to the clutch basket, or which are operably attached to the center clutch. The center clutch is a part of the inner hub. The clutch basket is operatively attached to the motorcycle motor. The center clutch is operatively attached to the motorcycle transmission, and eventually to the wheel. The disclosed technology is an adjuster which is placed between a center clutch and a pressure plate. In a preferred embodiment the adjuster is attached to the center clutch.

The disclosed adjuster is made up of having a generally round and threaded structure. At least one adjuster is threaded into the center clutch while providing a lifting surface which will lifts against the pressure plate. When the adjuster is turned one direction it will bias the pressure plate away from the center clutch decreasing the pressure in the clutch pack or to create gap between the pressure plate and clutch pack. When the adjuster is turned the opposite direction it will decrease the distance between the pressure plate and center clutch.

Optionally, at least one adjuster is threaded into the pressure plate while providing a lifting surface where the lifting surface pushes against the center clutch. When the adjuster is turned one direction it will bias the pressure plate away from the center clutch decreasing the pressure in the clutch pack or to create gap between the pressure plate and clutch pack. When the adjuster is turned the opposite direction it will decrease the distance between the pressure plate and center clutch.

Provided with the adjuster is a locking means to rotationally lock the adjuster position with the center clutch. Optionally, the locking means for the adjuster will lock the adjuster rotationally with the pressure plate.

The locking means utilizes a locking pin which indexes into formed cutouts within the threaded adjuster where the locking pin can be moved in and out of engagement with the adjuster in order to allow the adjuster to be moved and then locked into position as needed. The locking pin also has features for holding it in a fixed position when it is placed into engagement with the adjuster. Optionally, the locking means can consist of thread locking compound.

In yet another embodiment the locking means could be a threaded fastener which could attach independently to the center clutch. When the threaded fastener is tightened it indexes into the formed cutouts of the threaded adjuster to maintain the rotational position of the threaded adjuster.

The present invention for the improved adjuster is disclosed in FIGS. 1 through 10.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of preferred embodiments are to be regarded as illustrative in nature, and not as restrictive in nature.

DETAILED DESCRIPTION OF THE PREFERRED EMBODIMENTS

Figure 1:
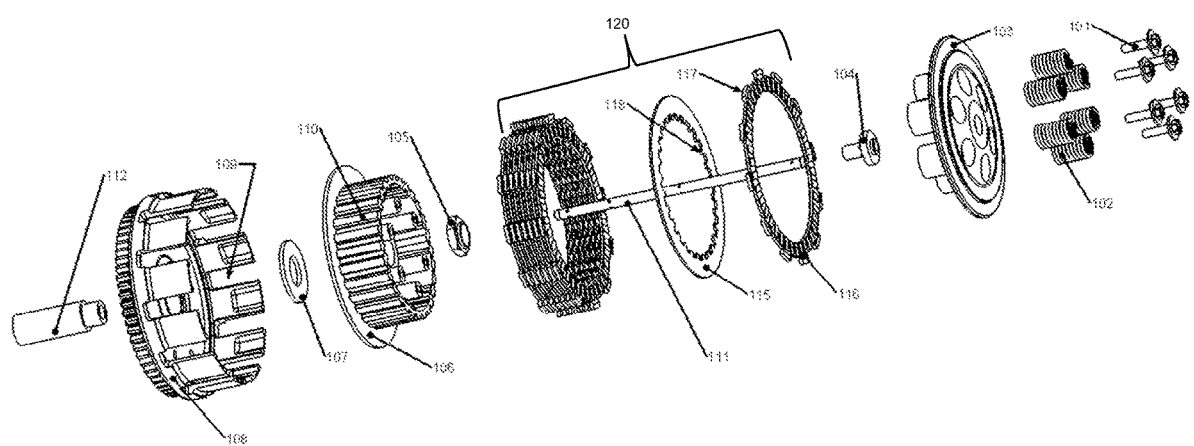
FIG. 1 is an exploded view of a prior art clutch.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Expanding friction disk centrifugal clutch systems are well known in the art and are typified by some of the products produced by Rekluse Motor Sports and include the Core EXP Clutch and EXP Clutch product lines for motorcycles and ATV's produced by Honda, KTM, Yamaha, Kawasaki and Suzuki among others.

An expanding friction disk is most commonly used with a typical clutch system comprised of a clutch input such as a clutch basket, a clutch output such as a center clutch, a pressure plate and one or more disks making up a clutch pack and disposed between the clutch input and clutch output. When the clutch pack is compressed, the clutch input and clutch output become rotationally coupled. Such clutch systems typically include a clutch disengagement system utilizing of a clutch lever mechanically coupled to the pressure plate such that when the clutch lever is actuated, the pressure plate's compressive force on the clutch pack is removed, disconnecting the rotational coupling between the clutch input and clutch output. Clutch disengagement systems typically couple the clutch lever to the pressure plate mechanically through a hydraulic actuation system or a cable actuation system.

An expanding friction disk is configured within the clutch pack like a typical friction disk and contains features coupling it rotationally to the clutch input when the clutch pack is under pressure. The pressure plate typically provides a compressive force via a spring mechanism and is typically biased away from the clutch pack so a gap exists when the expanding friction disk is not expanded. The clutch input is rotated by a motor and changes speed relative to motor speed changes, resulting in the expanding friction disk rotating with the clutch input. Centrifugal weights within the expanding friction disk are actionable causing the expanding friction disk to expand and thus remove the gap between the pressure plate and clutch pack resulting in the clutch pack becoming compressed and pressurized between the center clutch and pressure plate coupling the clutch input and clutch output.

The present invention provides for a novel, improved adjuster for creating the necessary gap between a pressure plate and clutch pack within a clutch assembly utilizing an expanding friction disk. Said gap is necessary when said expanding friction disk is in a collapsed state in order to allow said expanding friction disk to provide the automatic engagement and disengagement function it is intended to provide. Multiple embodiments are disclosed.

FIG. 1 is an exploded view of a prior art clutch. The configuration of the clutch basket 108, center clutch thrust washer 107, center clutch 106, transmission input shaft 112, center clutch nut 105, throw-out 104, throw-out rod 111, friction disk 116, drive plate 115, pressure plate 103, standard springs 102 and spring bolts 101 are typical of most modern motorcycle clutches, this structure is commonly employed in many types of power transmission devices. Clutch pack 120 is comprised of friction disks 116 and drive plates 115. The clutch basket 108 contains slots 109 which receive the friction disk tabs 117 and thus coupling the clutch basket 108 and friction disks 116 rotationally. The center clutch 106 contains a profiled ring 110 which provides rotational coupling to the teeth 118 of the drive plates 115. The clutch basket 108 is typically coupled rotationally to a power input source such as an engine and the center clutch 106 is typically coupled rotationally to an output such as a transmission through a transmission input shaft 112. In another embodiment the clutch basket 108 is coupled rotationally to an output and the center clutch 106 is coupled rotationally to a power input.

Typically the clutch basket 108 contains an opening in the center for receiving a transmission input shaft 112; the clutch basket 108 is configured with a bearing between the clutch basket 108 and the transmission input shaft so that the clutch basket 108 can rotate independently of the transmission input shaft with minimal friction. Typically a center clutch thrust washer 107 is disposed between a center clutch 106 and the clutch basket 108. A center clutch nut 105 secures the center clutch 106 against the center clutch thrust washer 107 which in turn is secured against a shoulder (not shown) on the transmission input shaft 112. The center clutch is typically rotationally coupled to the transmission input shaft 112 via a suitable spline.

Figure 2:
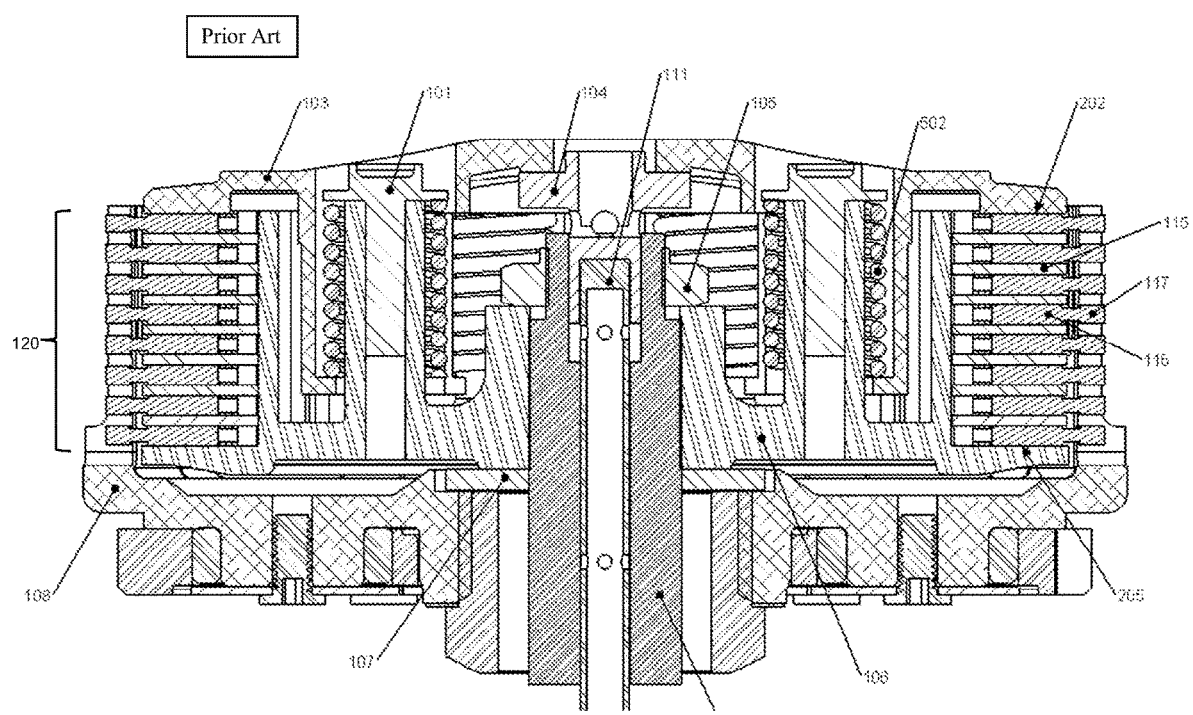
FIG. 2 is a section view of the prior art clutch shown in FIG. 1.

FIG. 2 is a section view of the prior art clutch shown in FIG. 1. As best seen in FIG. 2, the clutch pack 120 is comprised of eight friction disks 116 and seven drive plates 115. The clutch pack 120 establishes the distance between the pressure plate flange face 202 and center clutch flange face 205. The standard springs 102 act on the pressure plate 103 to compress the clutch pack 120 forcing the adjacent surfaces of the friction disks 116 and drive plates 115 to become coupled rotationally and in turn coupling the basket 108 and center clutch 106 rotationally. The throw-out 104 is coupled to a throw-out rod 111. The throw-out rod 111 is coupled to a clutch disengagement system (not shown). The clutch disengagement system (not shown) is operable to selectively position the throw-out rod 111 and throw-out 104 for the purpose of pushing the pressure plate 103 away from the clutch pack 120 to disengage the clutch. Alternatively, the clutch disengagement system (not shown) is operable to selectively position the throw-out rod 111 and throw-out 104 for the purpose of returning the pressure plate 103 into contact with the clutch pack 120 to engage the clutch. In another embodiment the clutch pack 120 is comprised of nine friction disks 116 and eight drive plates 115. In a preferred embodiment the clutch pack 120 is comprised of eight 3-millimeter thick friction disks 116 and seven 1.6-millimeter drive plates 115 resulting in the clutch pack 120 being approximately 35.2-millimeters tall. In other prior art the clutch pack 120 is less than 35-millimeters tall and is comprised of eight friction disks and seven drive plates that are less than 1.6-millimeters thick. In yet other prior art, the clutch pack 120 is taller than 35.2 millimeters and is comprised of nine friction disks which are approximately 4-millimeters thick and eight drive plates which are approximately 2-millimeters thick.

Figure 3:
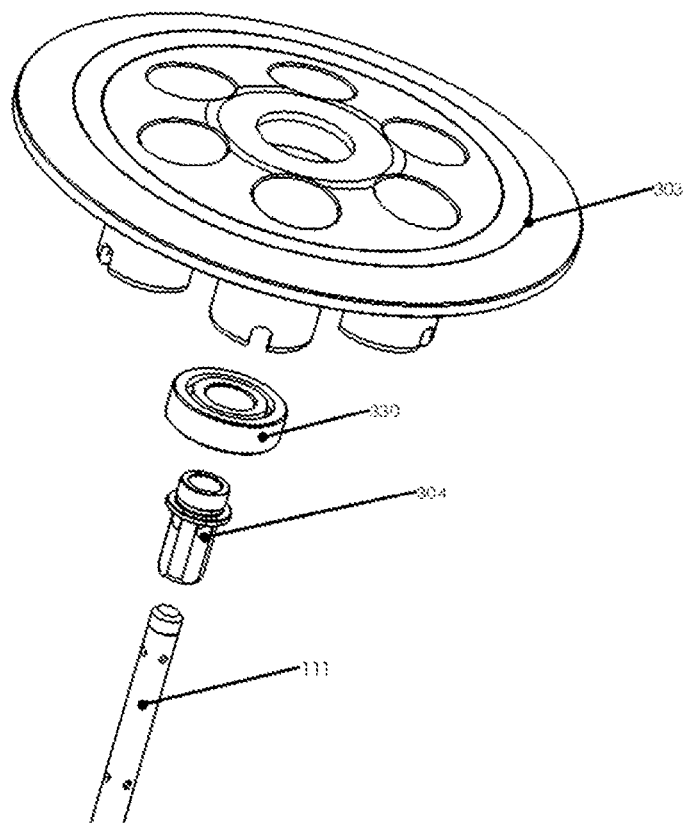
FIG. 3 is an exploded view of an alternative prior art pressure plate, throw-out and throw-out rod.

FIG. 3 is an exploded view of an alternative embodiment prior art pressure plate 303, throw-out 304, and throw-out bearing 330.

Figure 4:
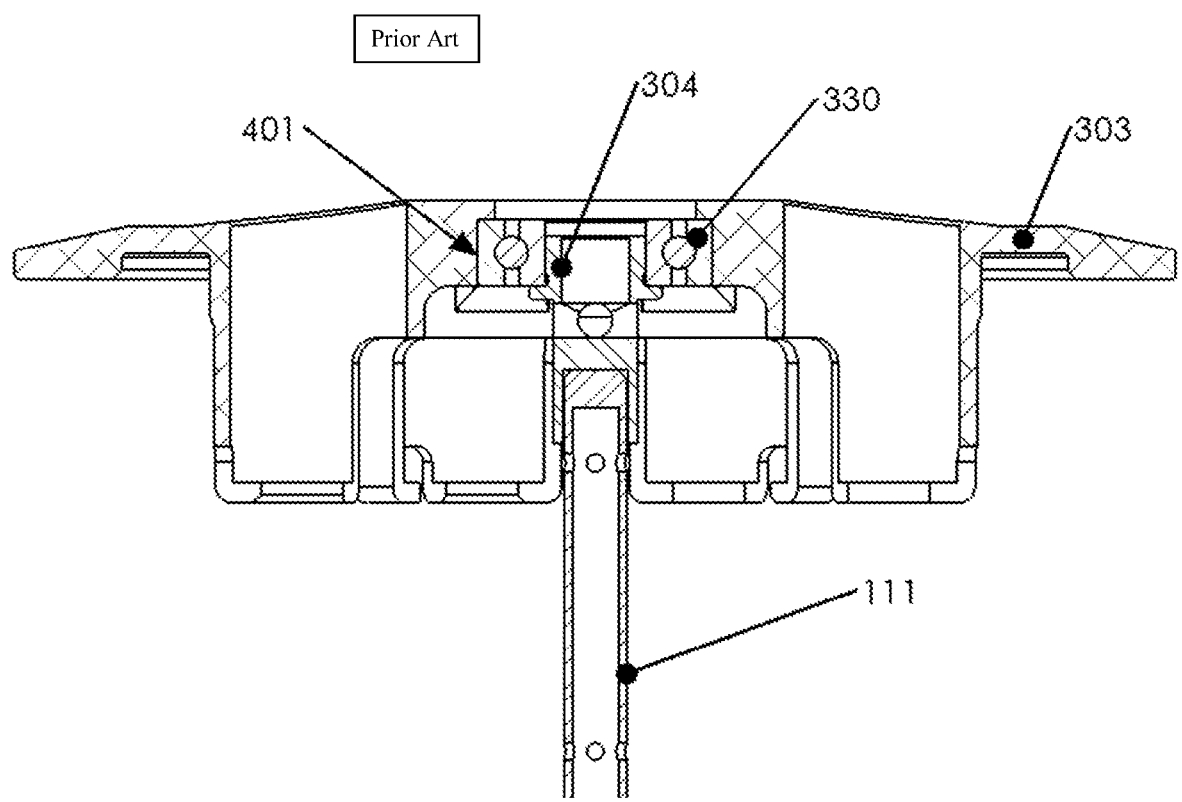
FIG. 4 is a section view of the components disclosed in FIG. 3.

FIG. 4 is a section view of the components shown in FIG. 3. As shown in FIG. 4 the throw-out bearing 330 locates into the pressure plate bore 401. The throw-out rod 111 is coupled to a clutch disengagement system (not shown). The throw-out 304 acts on the pressure plate 303 through the bearing 330 when the clutch lever (not shown) is activated. This embodiment of the pressure plate 303, throw-out 304 and throw-out bearing 330 function equivalently to the pressure plate 103 and throw-out 104 disclosed in FIGS. 1 and 2.

Figure 5:
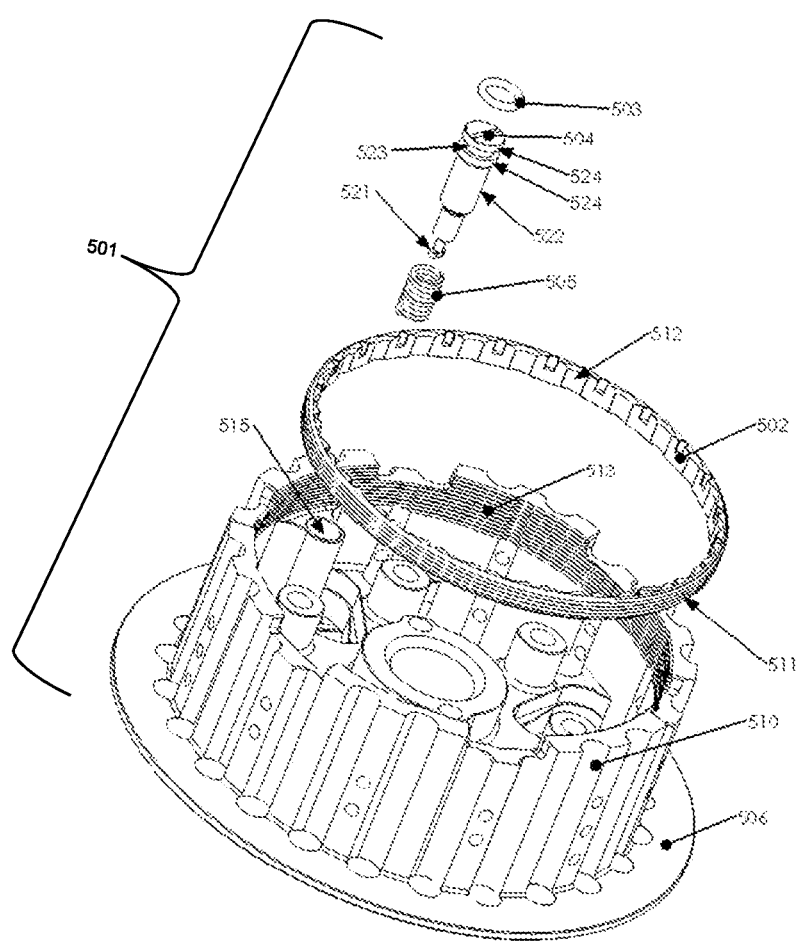
FIG. 5 is an exploded view of a preferred embodiment of a center clutch assembly including a preferred embodiment adjuster and preferred embodiment locking pin.

FIG. 5 discloses a preferred embodiment of a center clutch assembly 501 (alternatively called an inner hub) with an adjuster ring 502, center clutch 506, locking pin 504, spring 505 and o-ring 503. The center clutch contains a profiled ring 510 which provides rotational coupling to drive plates (not shown). The adjuster ring has threads 511 and detents 512. The center clutch 506 contains internal threads 513 which receive the threads 511 of the adjuster ring 502 allowing the adjuster ring 502 to thread into the center clutch 506. The locking pin 504 includes prongs 521, pin shaft 522, groove 523 and head diameter 524. The center clutch 506 contains a bore 515 for receiving the locking pin 504.

Figure 5A:
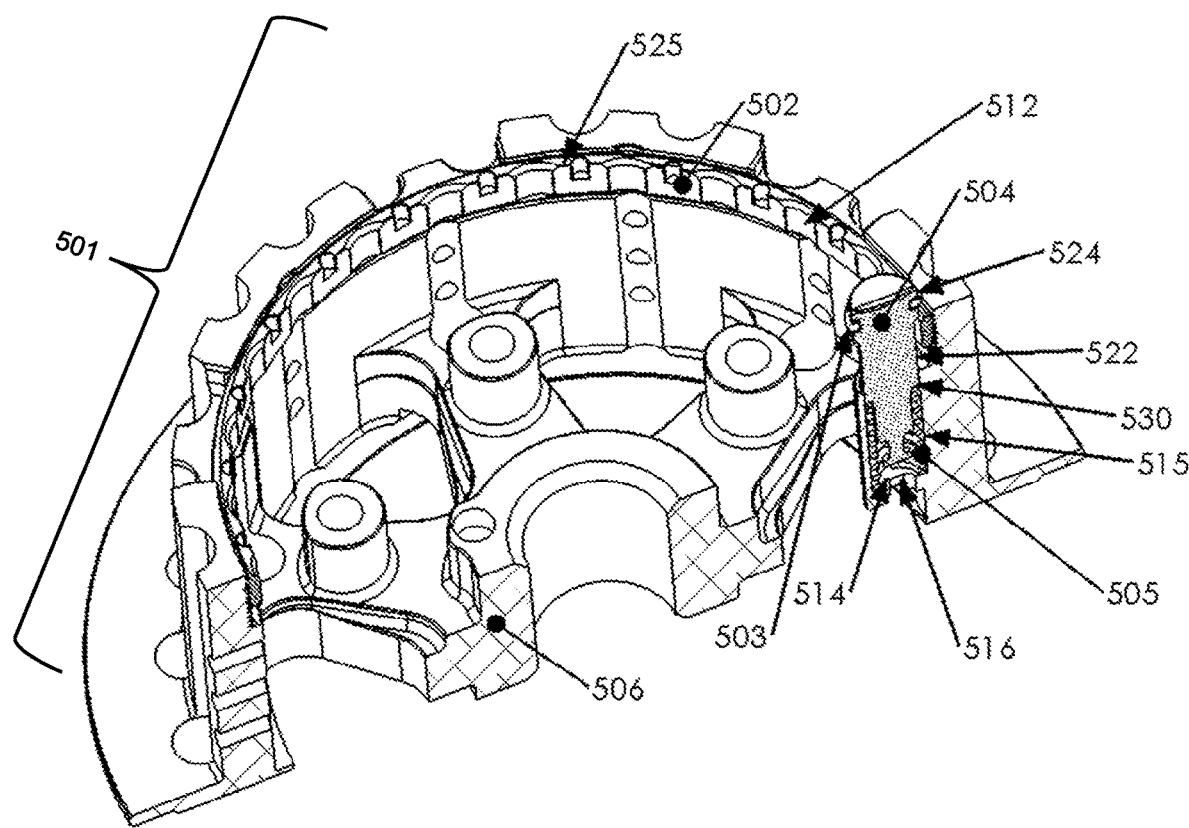
FIG. 5A is a sectioned isometric view of a preferred embodiment of a center clutch assembly showing a locking pin in an un-locked position.

FIG. 5A is an isometric sectioned view of a preferred embodiment of a center clutch assembly. As best shown in FIG. 5A the bore 515, of the center clutch 506, receives the locking pin 504. Specifically, the bore 515 locates the shaft 522 of the locking pin 504. The spring 505 pushes against the shoulder 523 of the locking pin 504 and the floor 514 of the bore 515. As depicted in FIG. 5A the locking pin 504 is positioned up and away from rotational engagement with the detents 512 of the adjuster ring 502 by a spring 505. With the locking pin 504 in the position shown the adjuster ring can be rotated in either radial direction and therefore change its axial position relative to the center clutch 506. A thru-slot 516 exists in floor 514. The through-slot 516 is shaped such that the prongs 521 of the locking pin 504 can pass through the through-slot 516 if the locking pin 504 is pushed in a downward direction compressing the spring 505.

Figure 5B:
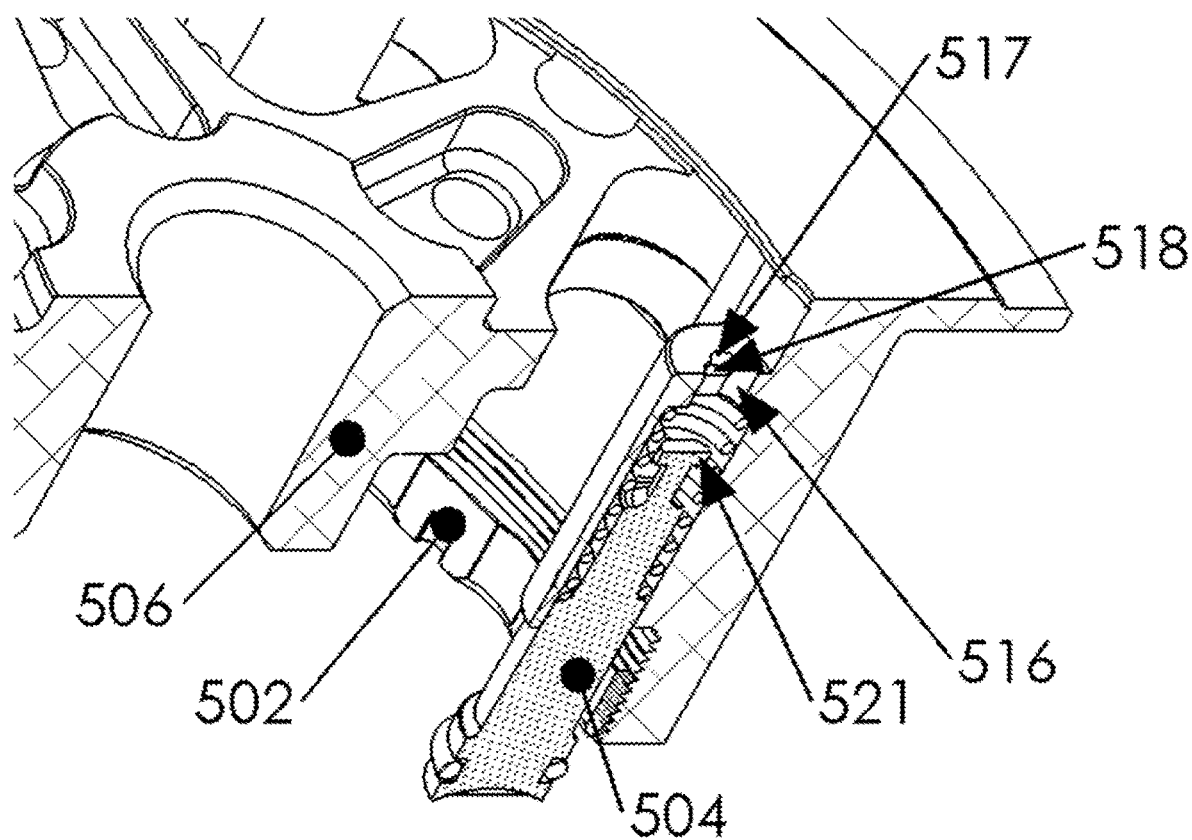
FIG. 5B is a sectioned isometric view of a preferred embodiment of a center clutch assembly with a view of the underside of the assembly showing a locking pin in an un-locked position.

FIG. 5B is another isometric sectioned view of a preferred embodiment of a center clutch assembly showing the underside detail. The locking pin 504 and adjuster ring 502 are in the same positions as shown in FIG. 5A. At the base of the bore 514 is an interlocking feature 517 which accepts the prongs 521 of the locking pin 504 such that when the prongs 521 are indexed into the interlocking feature 517 the locking pin 504 becomes rotationally and vertically positioned and held in place relative to the center clutch 506. The shelf 518 of the interlocking feature 517 limits the locking pin's 504 movement in the upward direction parallel to the direction the spring 505 applies force.

Figure 5C:
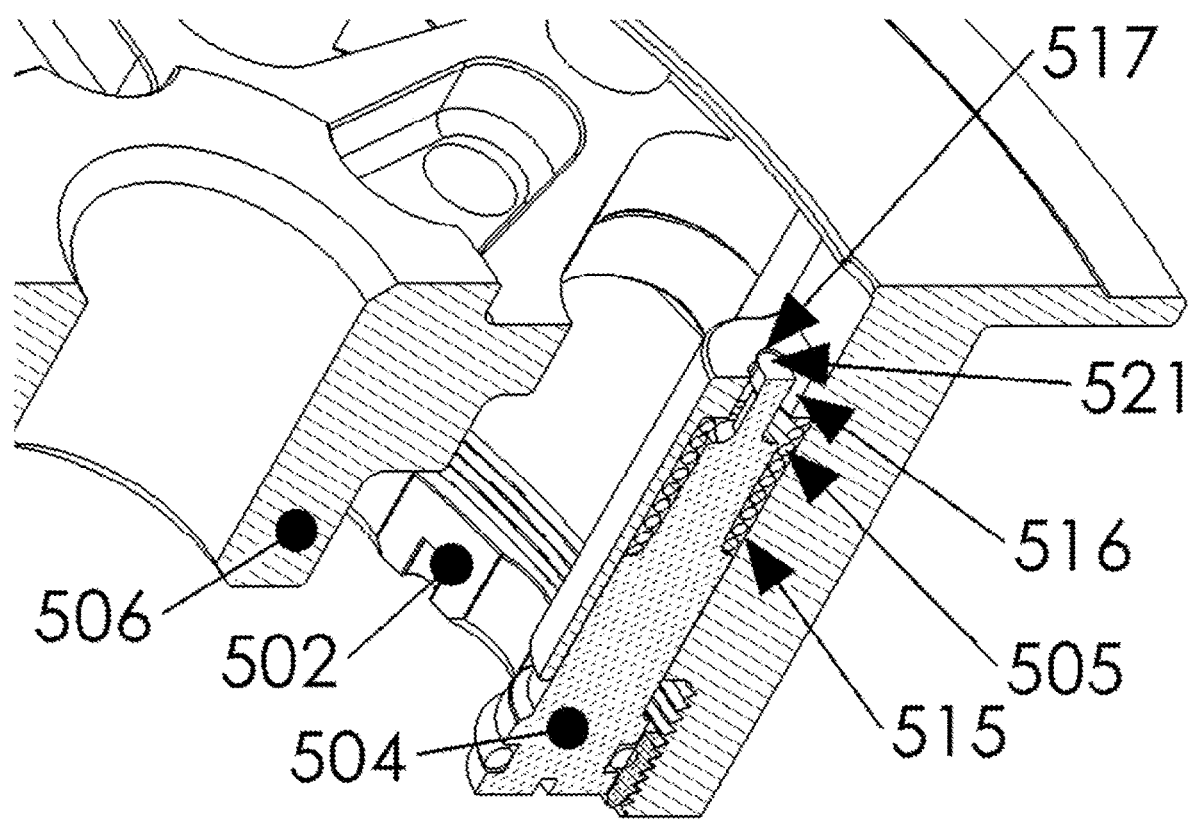
FIG. 5C is a sectioned isometric view of a preferred embodiment of a center clutch assembly with a view of the underside of the assembly showing a locking pin in a locked position.

FIG. 5C is an isometric sectioned view of a preferred embodiment of a center clutch assembly and shows the locking pin 504 in the locked position. As best can be seen in FIG. 5C the interlocking feature 517 of the center clutch 506 receives the prongs 521 of the locking pin 504. The spring 505 pushes against the shoulder 523 of the locking pin 504 and the floor 514 of the bore 515. When the prongs 521 are indexed into the interlocking feature 517 the spring 505 applies pressure to the locking pin 504 maintaining the locking pin 504 in a locked position. When the locking pin 504 is pushed in a downward direction compressing the spring further the prongs 521 will move out of engagement with the interlocking feature 517 allowing the locking pin 504 to be rotated such that the prongs align with the through-slot 516. When downward pressure is taken away from the locking pin the spring 505 will raise the head 524 of the locking pin 504 out of engagement with the detent 512 of the adjuster ring 502 allowing the adjuster ring 502 to rotate in either direction.

Figure 5D:
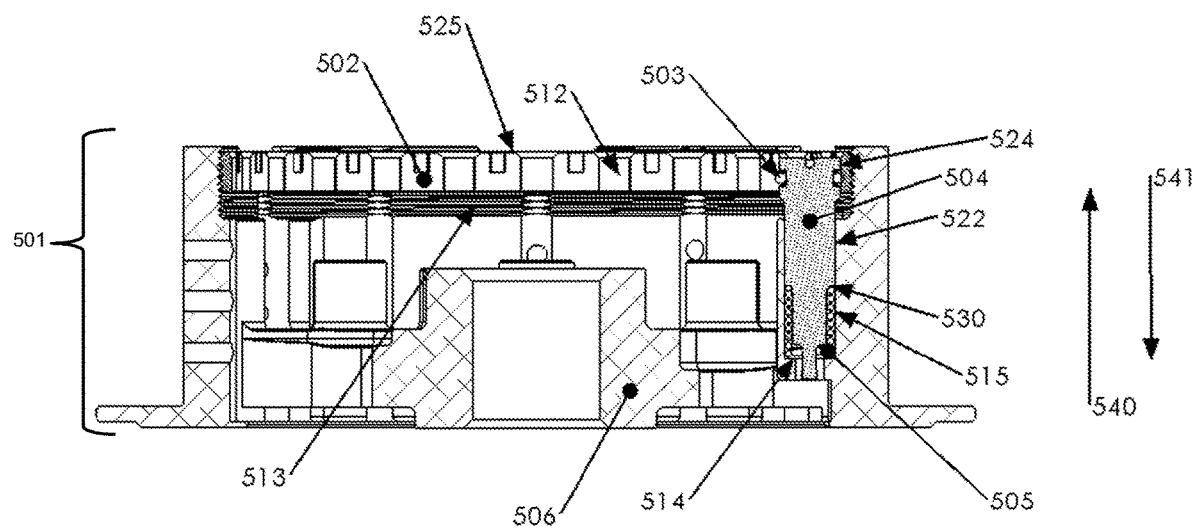
FIG. 5D is a sectioned view of a preferred embodiment of a center clutch assembly across the center of a locking pin and shows the locking pin in the locked position.

FIG. 5D is a sectioned view of a preferred embodiment of a center clutch assembly 501 and shows the locking pin 504 in the locked position. As best seen in FIG. 5D the bore 515 receives the locking pin 504. FIG. 5D shows the locking pin 504 placed in the locked position engaging the head diameter 524 with one of the detents 512 of the adjuster ring 502. The o-ring 503 compresses against the detent 512 and thus dampens vibration between the adjuster ring 502 and locking pin 504. With the locking pin 504 in this position, the adjuster ring 502 is unable to rotate significantly in either direction and therefore the position of the lifting surface 525 of the adjuster ring 502 is maintained in the shown position. When the locking pin 504 is pushed in a downward direction 541 far enough the locking pin 504 can then be rotated approximately 90 degrees un-timing the prongs 521 from the interlocking feature 517. When the downward force is released, the spring 505 will raise the head 524 of the locking pin 504 out of engagement with the detent 512 of the adjuster ring 502 allowing the adjuster ring 502 to rotate in either direction and thus changing the position of the lifting surface 525 of the adjuster ring 502 relative to the center clutch 506.

In an alternative embodiment a threaded fastener could be used instead of the locking pin 504 as depicted. In this alternative embodiment the bore 515 would be threaded and the head of the threaded fastener would locate into the detent 512 to maintain the position of the ring.

Figure 6:
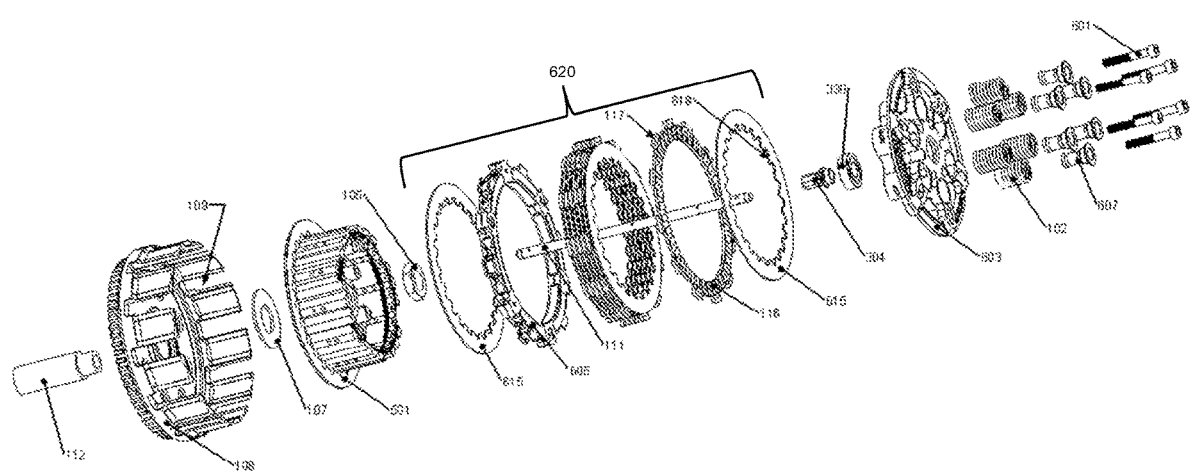
FIG. 6 is an isometric exploded view of a preferred embodiment of a center clutch assembly contained within a clutch assembly including an expanding friction disk.

FIG. 6 is an exploded isometric view of a preferred embodiment of a center clutch assembly configured within a clutch assembly 601 including a clutch pack 620 where the clutch pack 620 includes an expanding friction disk 605, friction disks 116, and drive plates 615. Also shown are pressure plate bolts 601, standoff spacers 607, standard springs 102, throw-out bearing 330, throw-out 304, throw-out rod 111, basket 108, center clutch thrust washer 107, center clutch assembly 501, transmission input shaft 112, center clutch nut 105, throw-out rod 111. The profiled ring 510 of the center clutch assembly 501 provides rotational coupling to the teeth 618 of the drive plates 615.

Figure 6A:
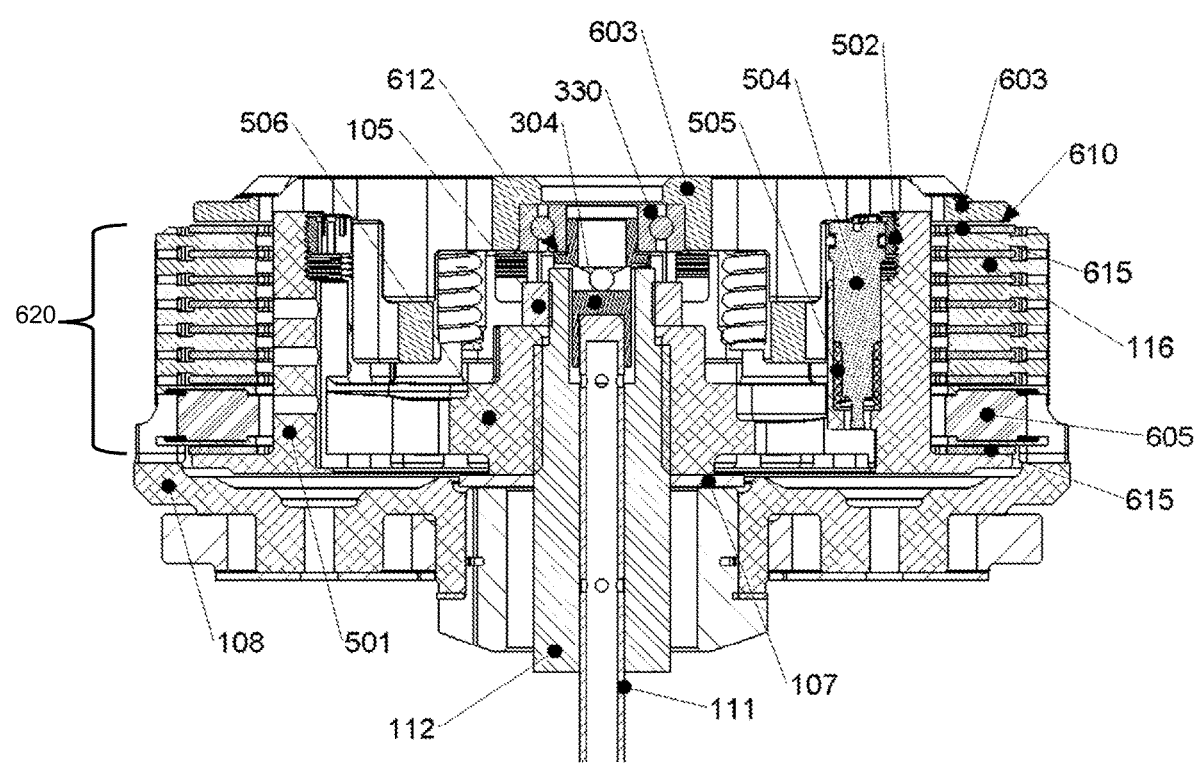
FIG. 6A is a sectioned view of the view of a preferred embodiment of a center clutch assembly contained within a clutch assembly including an expanding friction disk showing the adjuster lifting the pressure plate to create an installed gap and the locking pin and adjuster in the locked position.

FIG. 6A is a section view of the center clutch assembly 501 configured within the clutch configuration disclosed in FIG. 6. The adjuster ring 502 is biasing the pressure plate 603 away from the clutch pack 620 to create the installed gap 610. The locking pin 504 and adjuster ring 502 are shown in a locked position as previously described in order maintain the installed gap 610 when the expanding friction disk 605 is the collapsed position as shown. When the clutch basket 108 exceeds a threshold RPM, the expanding friction disk 605 expands and closes the installed gap 610 to engage the pressure plate.

A throw-out gap 612 exists between the throw-out 304 and bearing 330. The throw-out gap 612 depicts the position of the throw-out 304 when the clutch lever (not shown) is not in use by the operator. The throw-out gap 612 corresponds to free play in the clutch lever (not show). Free play is known as the amount of free movement in the clutch lever before the pressure plate 603 begins to be lifted away from the clutch pack 620 once free play has been taken up and the clutch lever (not shown) is pulled in further. The clutch pack 620 shows a drive plate 615 in both the bottom and top positions. The drive plates 615 are typically constructed of steel and provide a replaceable wear surface to mate against adjacent friction disks 116 and or expanding friction disk 605. In another embodiment the clutch pack 620 would have a friction disk 116 in direct contact with the center clutch 506 and/or pressure plate 603.

Figure 6B:
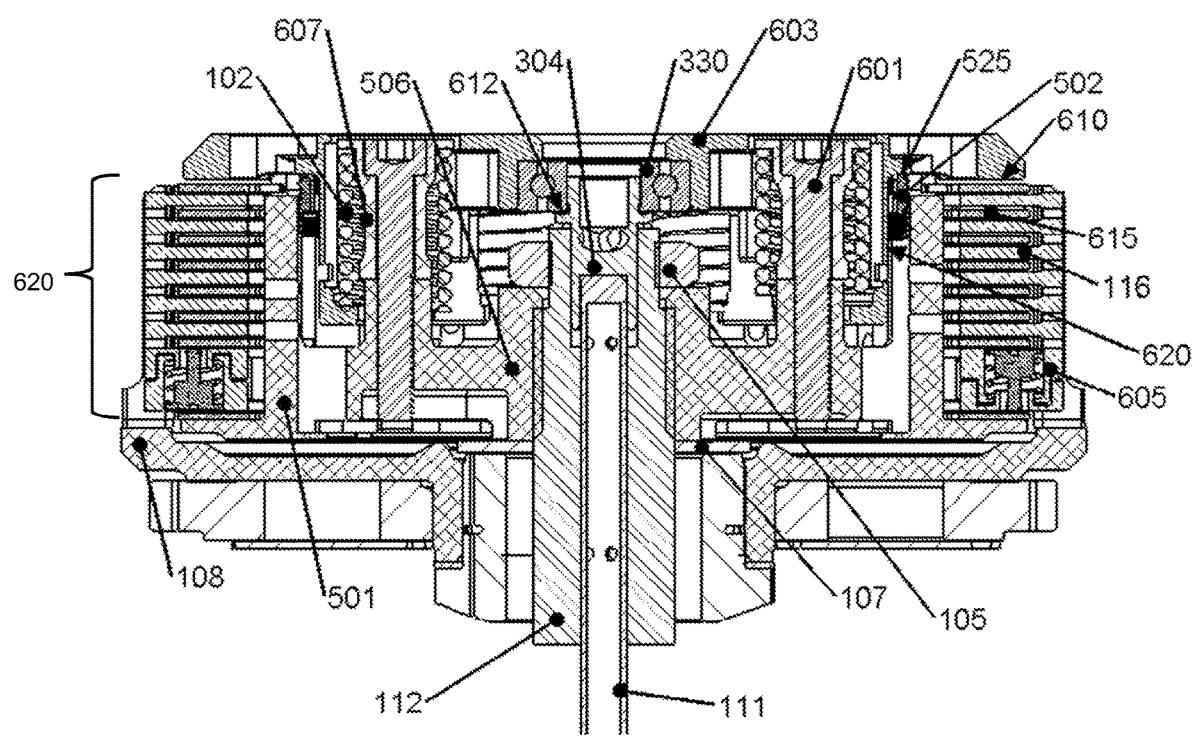
FIG. 6B is an alternative sectioned view of assembly shown in FIG. 6A showing the adjuster directly biasing the pressure plate away from the clutch pack creating an installed gap between the clutch pack and pressure plate.

FIG. 6B is another section view of the center clutch assembly 501 configured within the clutch configuration disclosed in FIG. 6. The adjuster ring 502 acts on the pressure plate 603 outside the periphery of the spring cups 620 through the lifting surface 525 directly contacting the underside of the pressure plate 603. With adjuster ring 502 acting on the pressure plate 603 as disclosed, the flexural characteristics of the pressure plate 603 provides similar clutch lever feeling as compared to a standard clutch for the operator. When the clutch basket 108 exceeds a threshold RPM causing the expanding friction disk 605 to expand the pressure plate 603 will be lifted away from contact with the lifting surface 525 of the adjuster ring 502. When the expanding friction disk 605 is expanded and lifting the pressure plate 603, the pressure plate 603 is under similar loading conditions as pressure plate 103 shown in FIG. 2 which allows the clutch lever feel to be similar when comparing the clutch in FIG. 2 to the clutch in FIGS. 6A and 6B. Also disclosed in FIG. 6, the pressure plate 603 maintains typical shape and structure in the area acted on by the throw-out 304 further enhancing the characteristics of the clutch lever (not shown) feel for the operator.

Figure 7:
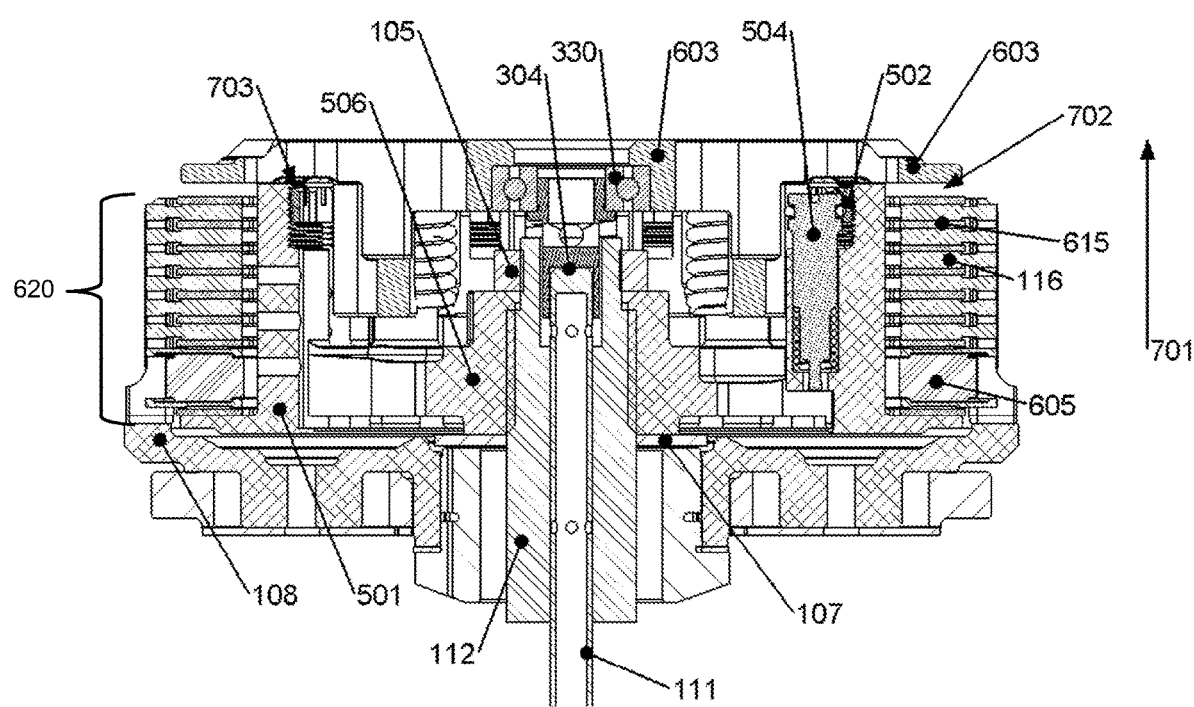
FIG. 7 is a section view of the clutch assembly disclosed in FIGS. 6, 6A and 6B with the adjuster moved away from the pressure plate allowing the installed gap to be removed.

FIG. 7 depicts the same embodiments as FIGS. 6A and 6B. FIG. 7 shows the adjuster ring 502 in the same position as was shown in FIG. 6A. As best seen in FIG. 7, the clutch lever (not shown) has been pulled in by the operator advancing the throw-out 304 in an outward direction 701 closing the throw-out gap 612 and lifting the pressure plate 603 further away from the clutch pack 620 creating a disengaged gap 702 between the pressure plate 603 and clutch pack 620. In this state, the clutch remains disengaged even when the clutch basket 108 exceeds a threshold RPM causing the expanding friction disk 605 to expand. Also shown is in FIG. 7 is the space 703 between the adjuster ring 502 and pressure plate 603 when the pressure plate 603 is lifted to the shown position.

Figure 8:
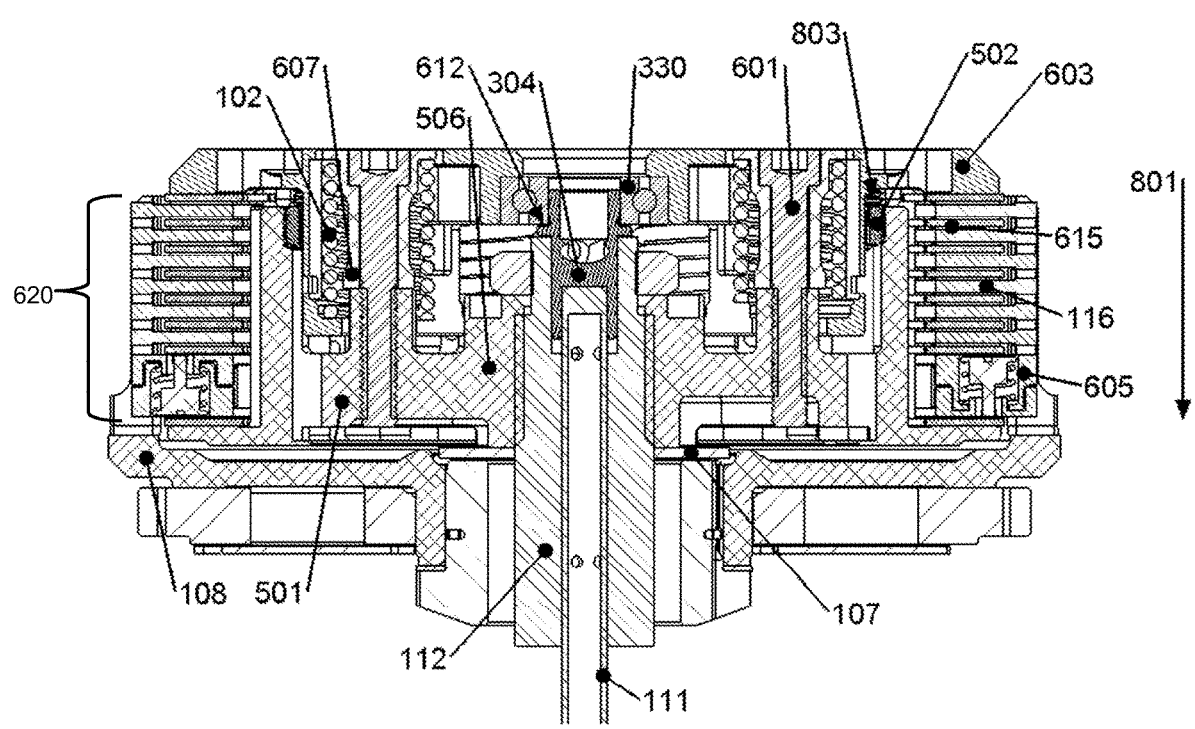
FIG. 8 is a section view of the clutch assembly disclosed in FIGS. 6, 6A and 6B with the adjuster moved away from the pressure plate allowing the installed gap to be removed.

FIG. 8 depicts the same embodiments as FIG. 6 and shows the adjuster ring 502 moved down away from the pressure plate 603 in the direction 801 and thus removing the installed gap 610. FIG. 8 shows the pressure plate 603 contacting the clutch pack 620 when the adjuster ring 502 is placed in the shown position. An adjuster gap 803 exists between the pressure plate 603 and the adjuster ring 502. With the pressure plate 603 in the shown position, the center clutch assembly 501 and basket 108 are rotationally coupled through the clutch pack 620 allowing the engine to be "bump" started. FIG. 8 also shows that the throw-out gap 612 remains allowing the pressure plate 603 to apply full force from the springs 102 to the clutch pack 620.

Figure 9:
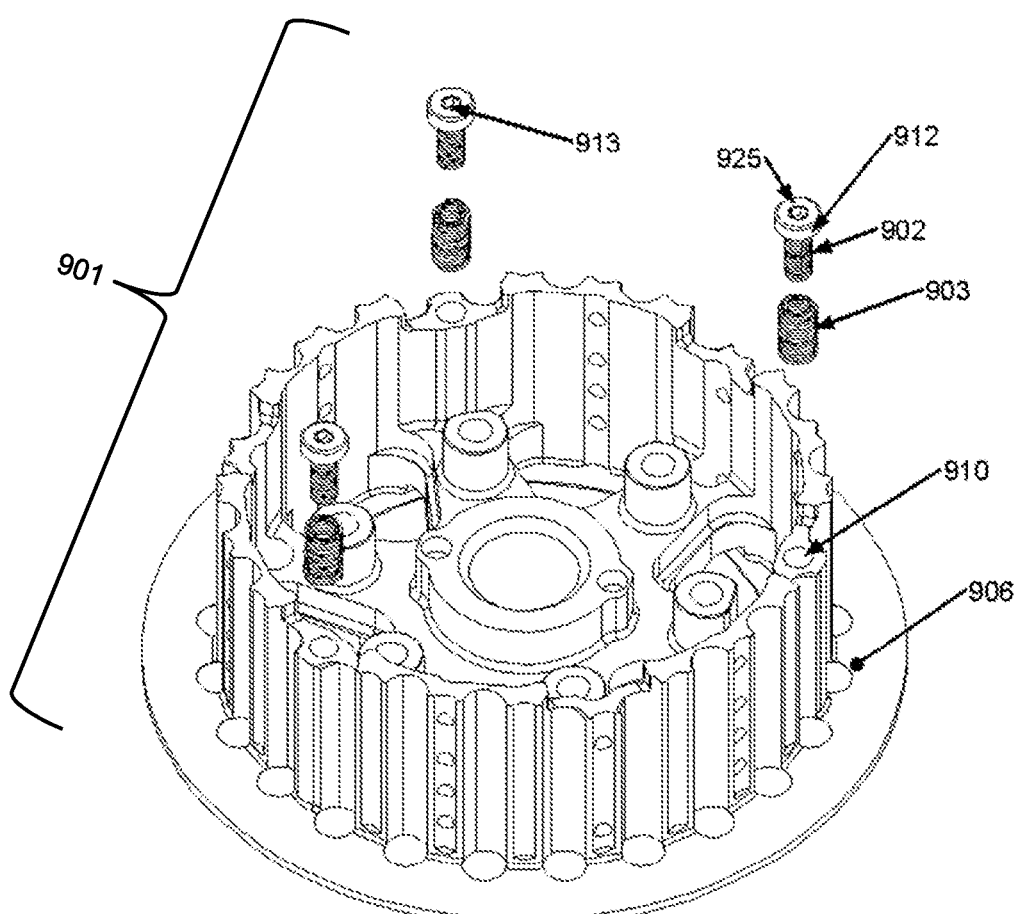
FIG. 9 is an exploded view of an alternative embodiment of the center clutch assembly showing another embodiment of an adjuster.

FIG. 9 is another embodiment of center clutch assembly 901. The center clutch assembly 901 includes adjuster screws 902, prevailing torque thread inserts 903 and center clutch 906. The adjuster screw 902 has a head 912, lifting surface 925 and hex hole 913. The hex hole 913 receives a hex key to allow for turning of the adjuster screw 902. The center clutch 906 includes threaded holes 910 for receiving the prevailing torque thread inserts 903. The thread insert 903 is capable of threading into the threaded hole 910 of the center clutch 906. The thread inserts 903 provide internal threads for the adjuster screw 902 to thread into. The prevailing torque thread inserts 903 provide interference threads to create friction between themselves and the adjuster screw 902 such that the adjuster screw 902 remains where it is turned to once set to a desired position.

Figure 10:
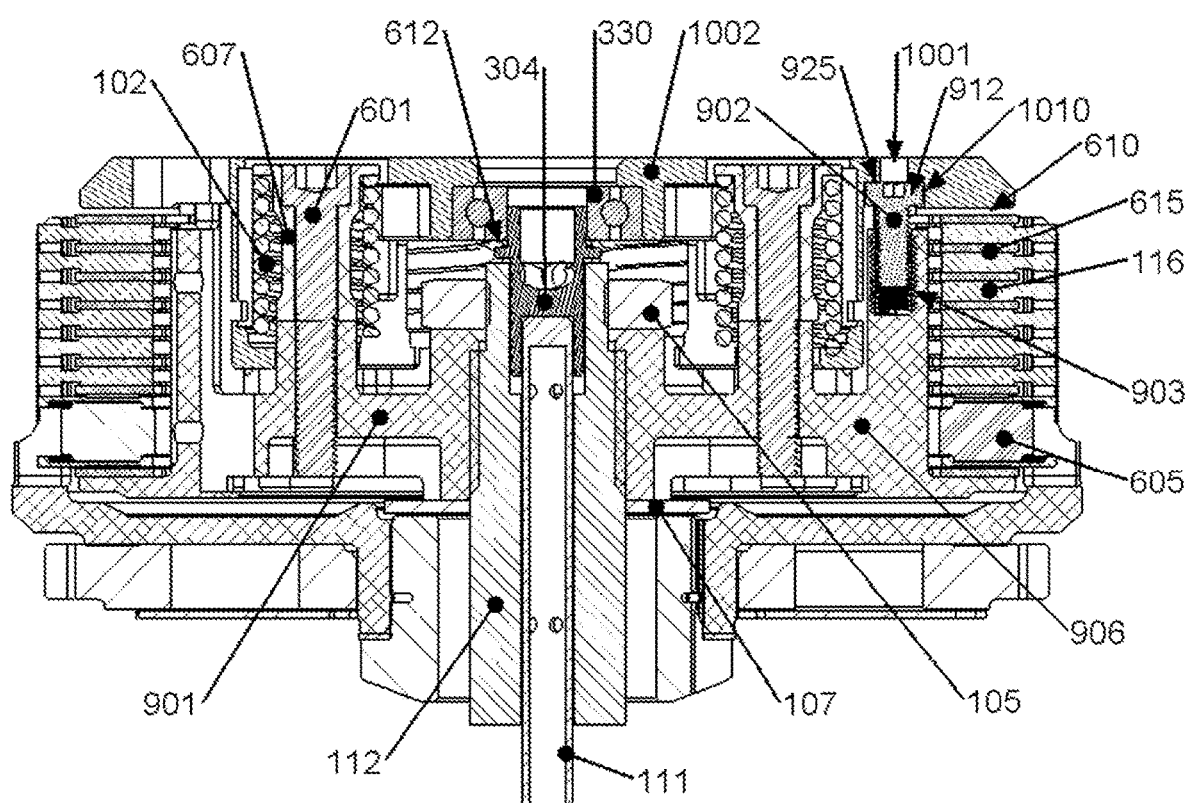
FIG. 10 is a section view of a clutch with an expanding friction disk and the alternative embodiment center clutch assembly shown in FIG. 9 showing the adjuster screw directly biasing the pressure plate away from the clutch pack creating an installed gap between the clutch pack and pressure plate.

FIG. 10 is a section view of the center clutch assembly 901 configured within the clutch configuration disclosed in FIG. 6. As best seen in FIG. 10, the head 912 of the adjuster screw 902 provides a lifting surface 925 to lift against a pressure plate 1002. The pressure plate 1002 contains counter bore 1010 for receiving the head 912 of the lifting screw 902.

In another embodiment the pressure plate 1002 uses a continuous slot or groove to allow room for the head 912. In yet another embodiment the adjuster screw 902 has a lower profile head 912 not requiring a corresponding feature in the pressure plate 1002. The adjuster screw 902 is biasing the pressure plate 1003 away from the clutch pack 620 to create the installed gap 610.

The adjuster screw 902 is shown in a locked position due to the prevailing torque insert 903 in order maintain the installed gap 610 when the expanding friction disk 605 is the collapsed position as shown. When the clutch basket 108 exceeds a threshold RPM, the expanding friction disk 605 expands and closes the installed gap 610 to engage the pressure plate. A throw-out gap 612 exists between the throw-out 304 and bearing 330. The throw-out gap 612 depicts the position of the throw-out 304 when the clutch lever (not shown) is not in use by the operator. The throw-out gap 612 corresponds to free play in the clutch lever (not show). Free play is known as the amount of free movement in the clutch lever before the pressure plate 603 begins to be lifted away from the clutch pack 620 once free play has been taken up and the clutch lever (not shown) is pulled in further. The pressure plate 1003 contains access holes 1001 which allow the adjuster screws 902 to be turned in order to adjust the pressure plate 1003 position while the pressure plate 1003 is installed. In this embodiment, the adjuster screws 902 provide similar pressure plate adjustment when compared to the disclosures in FIGS. 5 through FIG. 8.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. An inner hub assembly for use in a clutch of the type having a clutch basket with fingers and slots, a clutch pack having friction plates and driven plates and having an expanding friction disk and positioned within the clutch basket, and a pressure plate, the pressure plate configured to be biased toward said clutch pack to compress said clutch pack against said inner hub assembly, the pressure plate being movable from a compressed position away from the clutch pack to a disengaged position by a clutch disengagement system, said inner hub assembly comprising:

a center clutch comprising a profiled ring configured to provide rotational coupling to driven plates;

a threaded adjuster configured for threaded engagement with said center clutch, said threaded adjuster configured to be screw able in said center clutch in a first direction to bias the pressure plate away from and out of engagement with the clutch pack to create an installed gap between said clutch pack and the pressure plate, wherein said threaded adjuster being screwable in a second direction to reduce said installed gap; and a locking mechanism configured to prevent rotation of said threaded adjuster.

2. The inner hub assembly of claim 1 wherein said center clutch comprising internal threads, wherein said adjuster comprising an adjuster ring comprising threads configured for threaded engagement with said internal threads of said center clutch.

3. The inner hub assembly of claim 2, wherein said locking mechanism comprises a locking pin, wherein said locking pin comprises features configured for holding said locking pin in a fixed position when it is placed into engagement with said adjuster.

4. The inner hub assembly of claim 3, wherein said adjuster ring comprises a series of detents on an inner circumference of said adjuster ring, wherein said locking pin comprises a head and a shaft, wherein said locking pin is configured to move from an unlocked position allowing said adjuster ring to rotate to a locked position in which said locking pin is configured to prevent said adjuster ring from rotating, wherein a diameter of said head is configured to engage said detents of said adjuster ring when said pin is in a locked position.

5. The inner hub assembly of claim 4, wherein said locking pin comprises an o-ring positioned on said diameter of said locking pin and configured to dampen vibration between said adjuster ring and said locking pin.

6. The inner hub assembly of claim 4, wherein said locking pin comprises prongs at an end of said shaft of said locking pin, wherein said center clutch comprises a bore for receiving said locking pin, wherein said bore comprises a base, wherein said base comprises an interlocking feature configured to index with said prongs to limit movement of said locking pin.

7. The inner hub assembly of claim 6 wherein said inner hub assembly comprises a spring configured to bias said locking pin into said interlocking feature to limit movement of said locking pin.

8. The inner hub assembly of claim 7 wherein said spring is positioned on said shaft of said locking pin between a shoulder of said locking pin and a floor of said bore to bias said locking pin away from said floor of said bore.

9. The inner hub assembly of claim 8, wherein said floor of said bore comprises a through slot, wherein said prongs of said locking pin are configured to be inserted through said through slot and said locking pin rotated thereafter with said spring biasing said locking pin to engage said locking pin with said interlocking feature, wherein said locking pin is configured to be released from said interlocking feature by depressing said locking pin causing compression of said spring and allowing for rotation of said prongs from said interlocking feature.

10. The inner hub assembly of claim 4, wherein each of said detents in said series of detents comprises an arcuate shape.

11. The inner hub assembly of claim 3, wherein said locking pin comprises a threaded pin configured for threaded engagement to a bore of said center clutch.

12. The inner hub assembly of claim 1, wherein said threaded adjuster comprises a lifting screw, wherein said lifting screw is configured for threaded engagement with a threaded hole of said center clutch, wherein said lifting screw comprising a head having a lifting surface configured to lift against the pressure plate.

13. The inner hub assembly of claim 12, wherein said inner hub assembly further comprising said pressure plate, wherein said pressure plate comprises a counter bore for receiving said head of said lifting screw.

14. The inner hub assembly of claim 12 wherein said locking mechanism comprises a prevailing torque insert configured for threaded engagement with said threaded hole of said center clutch and with said lifting screw to retain said lifting screw in a locked position.

15. The inner hub assembly of claim 12, wherein said head of said lifting screw comprises a hole configured for receiving a key to turn said lifting screw.

16. The inner hub assembly of claim 15, wherein said hole comprises a hex hole, wherein said key comprises a hex key.

17. The inner hub assembly of claim 12 wherein said inner hub assembly comprising a plurality of adjuster screws, wherein said center clutch comprising a plurality of threaded holes each configured for threaded engagement with one adjuster screw.

18. The inner hub assembly of claim 15 further comprising said pressure plate, wherein said pressure plate comprises an access hole for positioning said key through said pressure plate to reach said hole.

19. The inner hub assembly of claim 1 wherein said locking mechanism comprises a thread locking compound.

* * * * *